US012811450B2

(12) United States Patent
Nachtmann et al.

(10) Patent No.: US 12,811,450 B2
(45) Date of Patent: Nov. 24, 2026

(54) ELECTRIC MACHINE

(71) Applicant: Schaeffler Technologies AG & Co. KG, Herzogenaurach (DE)

(72) Inventors: Florian Nachtmann, La Wantzenau (FR); Laurent Ineichen, Strasbourg (FR); Matthias Bauer, Freiburg (DE); Kay Juckelandt, Fürth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 438 days.

(21) Appl. No.: 18/279,900

(22) PCT Filed: Mar. 1, 2022

(86) PCT No.: PCT/DE2022/100168
§ 371 (c)(1),
(2) Date: Sep. 1, 2023

(87) PCT Pub. No.: WO2022/184211
PCT Pub. Date: Sep. 9, 2022

(65) Prior Publication Data
US 2024/0146133 A1 May 2, 2024

(30) Foreign Application Priority Data
Mar. 5, 2021 (DE) ..................... 10 2021 105 338.2

(51) Int. Cl.
*H02K 1/32* (2006.01)
*H02K 1/276* (2022.01)
(Continued)

(52) U.S. Cl.
CPC ............ *H02K 1/32* (2013.01); *H02K 1/2773* (2013.01); *H02K 9/19* (2013.01); *H02K 21/14* (2013.01)

(58) Field of Classification Search
CPC .......... H02K 1/32; H02K 1/2773; H02K 9/19; H02K 21/14; H02K 2213/03; H02K 7/003; H02K 2205/09
See application file for complete search history.

(56) References Cited

U.S. PATENT DOCUMENTS 2,149,374 A 3/1939 Wellman
4,635,491 A 1/1987 Yamano et al.
(Continued)

FOREIGN PATENT DOCUMENTS

CN 111384795 A 7/2020
CN 111769674 A 10/2020
(Continued)

*Primary Examiner* — Christopher M Koehler
*Assistant Examiner* — Riley Owen Stout
(74) *Attorney, Agent, or Firm* — Volpe Koenig

(57) ABSTRACT

An electric machine has a stator and a rotor which is rotatably mounted relative to the stator. The rotor has a rotor shaft and a rotor body which is rotationally fixed to the rotor shaft. The rotor shaft has a hydraulic channel which extends in the axial direction, can be filled with a hydraulic fluid, and from which a first radial fluid channel extends outwards in the radial direction. At least one ring disc-shaped cover element is rotationally fixed to the rotor body on an axial end face of the rotor body, and the cover element together with the axial end face of the rotor body forms at least one first cooling channel which is open on both sides and which can be hydraulically coupled to the first radial fluid channel such that a hydraulic fluid can be conveyed out of the hydraulic channel of the rotor shaft and through the radial fluid channel and the first cooling channel in the radial direction in a centrifugal force-supported manner.

9 Claims, 5 Drawing Sheets

(51) Int. Cl.
*H02K 9/19* (2006.01)
*H02K 21/14* (2006.01)

(56) References Cited

U.S. PATENT DOCUMENTS

| | | | |
|---|---|---|---|
| 4,747,319 A | 5/1988 | Sakuta | |
| 6,009,668 A | 1/2000 | Reddy | |
| 8,839,937 B2 | 9/2014 | Hazama et al. | |
| 9,694,643 B2 | 7/2017 | Mersmann et al. | |
| 10,883,446 B2 | 1/2021 | Werquin et al. | |
| 10,942,547 B2 | 3/2021 | Gault et al. | |
| 11,027,587 B2 | 6/2021 | Krehmer | |
| 11,173,766 B1 | 11/2021 | Hall et al. | |
| 11,199,245 B2 | 12/2021 | Kováč | |
| 11,199,249 B2 | 12/2021 | Holzberger et al. | |
| 2008/0274816 A1 | 11/2008 | McClellan | |
| 2017/0299055 A1 | 10/2017 | Tomita et al. | |
| 2018/0062463 A1* | 3/2018 | Ito | H02K 1/32 |
| 2019/0207451 A1 | 7/2019 | Yoshizawa | |
| 2020/0036248 A1* | 1/2020 | Krais | H02K 1/30 |
| 2020/0055361 A1 | 2/2020 | Krehmer | |
| 2020/0127534 A1 | 4/2020 | Fujita et al. | |
| 2020/0370628 A1 | 11/2020 | Sommerkorn et al. | |
| 2021/0408854 A1* | 12/2021 | Wang | H02K 1/28 |
| 2023/0137765 A1 | 5/2023 | Fischer et al. | |

FOREIGN PATENT DOCUMENTS

| | | | |
|---|---|---|---|
| CN | 112421832 | A | 2/2021 |
| DE | 112008002978 | T5 | 11/2010 |
| DE | 112010004773 | T5 | 10/2012 |
| EP | 3382856 | A1 | 10/2018 |
| EP | 3598611 | A1 | 1/2020 |
| FR | 3064839 | A1 | 10/2018 |
| JP | 2004068982 | A | 3/2004 |
| JP | 2011254571 | A | 12/2011 |
| JP | 2014093816 | A | 5/2014 |
| JP | 2014103722 | A | 6/2014 |
| JP | 2019168031 | A | 10/2019 |
| JP | 2020120425 | A | 8/2020 |
| WO | 2011118062 | A1 | 9/2011 |
| WO | 2018030325 | A1 | 2/2018 |
| WO | 2020174176 | A1 | 9/2020 |
| WO | 2020258970 | A1 | 12/2020 |

* cited by examiner

ELECTRIC MACHINE

CROSS-REFERENCE TO RELATED APPLICATIONS

This application is the U.S. National Phase of PCT Appln. No. PCT/DE2022/100168 filed Mar. 1, 2022, which claims priority to DE 102021105338.2 filed Mar. 5, 2021, the entire disclosures of which are incorporated by reference herein.

TECHNICAL FIELD

The present disclosure relates to an electric machine comprising a stator and a rotor which is rotatably mounted relative to the stator, wherein the rotor comprises a rotor shaft and a rotor body which is connected to the rotor shaft in a rotationally fixed manner, wherein the rotor shaft has a hydraulic channel which extends in the axial direction and can be filled with a hydraulic fluid from which a first radial fluid channel extends outwards in the radial direction, wherein at least one annular disk-shaped cover element is connected to the rotor body in a rotationally fixed manner on an axial end face of the rotor body, and the cover element together with the axial end face of the rotor body forms at least one first cooling channel open on both sides, which can be hydraulically coupled to the first radial fluid channel so that a hydraulic fluid can be conveyed out of the hydraulic channel of the rotor shaft and in the radial direction through the radial fluid channel and the first cooling channel in a centrifugal force-supported manner.

BACKGROUND

Electric motors are increasingly being used to drive motor vehicles to create alternatives to internal combustion engines that require fossil fuels. Significant efforts have already been made to improve the suitability of electric drives for everyday use and also to be able to offer users the driving comfort to which they are accustomed.

Permanently excited synchronous machines are used in many such electromobility applications. Such a permanently excited synchronous machine usually comprises a stator to be energized and a permanently excited rotor. The rotor usually comprises a shaft, balancing plates, laminated rotor cores and magnets. The magnets are generally fixed in the laminated rotor cores.

The performance of an electric rotary machine depends, among other things, on the heat generated during operation, since the efficiency of the machine decreases with increasing heat.

It is also known that what are termed hot spots can occur in an electric rotary machine. A hot spot is a region of greatest heat generation in the rotor and/or stator during operation of the electric machine.

Measures that are generally used to cool a rotor and stator of an electric machine are cooling the rotor radially from the inside using a coolant employing centrifugal force, wherein the coolant flows along the end faces of the rotor, and cooling the stator radially from the outside using a coolant as well as a dissipation of the coolant and thus also the heat absorbed by the coolant.

Due to the trend towards ever higher speeds of electric machines in the field of electromobility, a transverse interference fit is generally required for the rotor stacks, which is why it is usually not possible to supply coolant to the stack. The high speeds of modern electric drives in the vehicle sector also mean that centrifugal force-related suction effects occur on the radial coolant channels, which can result in an uncontrolled distribution of hydraulic fluid in the cooling system of the corresponding electric machine. This uncontrolled and undesired distribution of hydraulic fluid as a result of such suction effects can consequently lead to insufficient cooling capacity in thermally critical regions of the electric machine. This in turn leads to reduced efficiency of the electric machine or even to thermal damage and failure of the electric machine.

SUMMARY

The object of the disclosure is therefore to alleviate or completely eliminate these disadvantages and to provide an electric machine which can provide controlled and reliable cooling of the rotor even at high speeds.

This object is achieved by the measures described herein. Further advantageous embodiments are specified herein and in the claims.

According to one aspect, an electric machine comprises a stator and a rotor which is mounted rotatably relative to the stator, wherein the rotor comprises a rotor shaft and a rotor body which is connected to the rotor shaft in a rotationally fixed manner, wherein the rotor shaft has a hydraulic channel which extends in the axial direction and can be filled with a hydraulic fluid, from which a first radial fluid channel extends outwards in the radial direction, wherein at least one annular disk-shaped cover element is connected to the rotor body in a rotationally fixed manner on an axial end face of the rotor body, and the cover element together with the axial end face of the rotor body forms at least one first cooling channel open on both sides, which can be hydraulically coupled to the first radial fluid channel so that a hydraulic fluid can be conveyed in a centrifugal force-supported manner out of the hydraulic channel of the rotor shaft and in the radial direction through the radial fluid channel and the first cooling channel, wherein the first radial fluid channel has a first flow cross-section and a second flow cross-section formed in the radial direction above the first flow cross-section, wherein the first flow cross-section and the second flow cross-section have a ratio of between 1:1.5-1:25, wherein between 5%-75%, preferably between 15-25% of the second flow cross-section of the first radial fluid channel is covered in sections in the axial direction by the rotor body and wherein the second flow cross-section opens into a first storage chamber, which is arranged in the radial direction between the rotor shaft and the first cooling channel, wherein the volume of the first radial flow channel has a ratio of between 0.5:1-3:1 to the volume of the first storage chamber.

This configuration of the hydraulic cooling path on a rotor of the electric machine according to the disclosure can reliably prevent the occurrence of suction effects at high speeds.

The partial overlapping of the second flow cross-section of the first radial fluid channel in the axial direction by the rotor body can improve the wetting of the rotor body, particularly at high speeds.

In connection with the present disclosure, the terms "radial" and "axial" always refer to the axis of rotation of the rotor.

First, the individual elements of the claimed subject matter of the disclosure are explained in the order in which they are named in the claims, and particularly preferred embodiments of the subject matter of the disclosure are described below.

Electric machines are used to convert electrical energy into mechanical energy and/or vice versa, and generally comprise a stationary part referred to as a stator or armature, and a part referred to as a rotor and arranged movably relative to the stationary part. The electric machine is intended in particular for use within a drive train of a hybrid or fully electric motor vehicle. In particular, the electric machine is dimensioned in such a way that vehicle speeds of more than 50 km/h, preferably more than 80 km/h and in particular more than 100 km/h can be achieved. The electric motor particularly preferably has an output of more than kW, preferably more than 50 kW and in particular more than 70 kW. Furthermore, it is preferred that the electric machine provides speeds greater than 5,000 rpm, particularly preferably greater than 10,000 rpm, very particularly preferably greater than 12,500 rpm.

The electric machine according to the disclosure is configured in particular as a radial flux machine, in particular for use within a drive train of a motor vehicle. In the context of this application, the drive train of a motor vehicle is understood to mean all components that generate the power for driving the motor vehicle in the motor vehicle and transmit same to the road via the vehicle wheels.

The stator of an electric machine is preferably constructed in a cylindrical manner, and preferably consists of electrical laminations that are electrically insulated from one another and are constructed in layers and packaged to form laminated cores.

A rotor is the rotating (spinning) part of an electric machine. The rotor comprises a rotor shaft and one or more rotor bodies arranged on the rotor shaft in a rotationally fixed manner. The rotor shaft can be hollow, which on the one hand results in a weight savings and on the other hand allows the supply of lubricant or coolant to the rotor body.

A rotor body in the context of the disclosure is understood to mean the rotor without a rotor shaft. The rotor body is therefore composed in particular of the laminated rotor core and the magnetic elements introduced into the pockets of the laminated rotor core or fixed circumferentially to the laminated rotor core, and any axial cover parts present for closing the pockets.

The rotor body can comprise one or more laminated rotor cores, which are sometimes also referred to as stacks. A laminated rotor core is understood to mean a plurality of laminated individual laminations or rotor laminations, which are generally made from electrical sheet metal and are stacked and packaged one on top of the other to form a stack, what is termed the laminated rotor core. The individual laminations can then remain held together in the laminated core by gluing, welding, or screwing.

The electric machine can furthermore have a cooling system. A cooling system is used to dissipate the heat generated by electrical losses within an electric machine. Such a cooling system can have cooling channels within the rotor (rotor cooling channel) and/or stator (stator cooling channel) through which a corresponding cooling medium or hydraulic fluid is guided for the purpose of dissipating the heat. For this purpose, the cooling system can in particular have one or more pumps which move the cooling medium through the cooling system, preferably in a closed circuit.

In the electric machine, the hydraulic fluid has the function of dissipating heat as efficiently as possible from regions of the electric machine that are heating up and of avoiding undesired overheating of these regions. In addition to this main object, the hydraulic fluid can also provide lubrication and corrosion protection for the moving parts and the metal surfaces of the cooling system of the electric machine. Moreover, it can in particular also dissipate impurities (for example due to abrasion), water, and air.

The hydraulic fluid is preferably a liquid. The hydraulic fluid can in particular be an oil. In principle, however, it is also conceivable to use aqueous hydraulic fluids, for example also emulsions.

Furthermore, the electric machine can preferably be provided for use within a hybrid module for a motor vehicle. In a hybrid module, structural and functional elements of a hybridized drive train can be spatially and/or structurally combined and preconfigured so that a hybrid module can be integrated into a drive train of a motor vehicle in a particularly simple manner. In particular, an electric machine and a clutch system, in particular with a separating clutch for engaging the electric machine in and/or disengaging the electric machine from the drive train, can be present in a hybrid module.

In particular, the electric machine can preferably also be provided for use in an electric axle drive train within a drive train of a motor vehicle. An electric axle drive train of a motor vehicle comprises an electric machine and a transmission, wherein the electric machine and the transmission form a structural unit. This structural unit is sometimes also referred to as an E-axle.

According to an advantageous embodiment of the disclosure, it can be provided that the rotor shaft has a hydraulic channel that extends in the axial direction and can be filled with hydraulic fluid, from which the first radial fluid channel and a second radial fluid channel that is axially spaced apart extend outwards in the radial direction, wherein on the axial end faces of the rotor body, at least one annular disk-shaped cover element is connected to the rotor body in a rotationally fixed manner, and the cover element, together with one of the axial end faces of the rotor body, forms at least one cooling channel open on both sides, which can be hydraulically coupled to one of the radial fluid channels so that the rotor has at least one corresponding first cooling channel and at least one second cooling channel, so that a hydraulic fluid can be conveyed by centrifugal force from the hydraulic channel of the rotor shaft and in the radial direction through the radial fluid channels and the cooling channels, wherein the second radial fluid channel has a third flow cross-section and a fourth flow cross-section above the third flow section formed in the radial direction, wherein the third flow cross-section and the fourth flow cross-section have a ratio of between 1:1.5-1:25 and wherein between 5%-75%, preferably between 15-25% of the fourth flow cross-section of the second radial fluid channel is covered in sections in the axial direction by the rotor body, and the fourth flow cross-section opens into a second storage chamber which is arranged in the radial direction between the rotor shaft and the second cooling channel, wherein the volume of the first radial flow channel has a ratio of between 0.5:1-3:1 to the volume of the first storage chamber.

The advantage of this configuration is that hydraulic fluid can be distributed evenly between the two hydraulic paths for cooling the rotor body, since suction effects can be reliably prevented by the configuration of the hydraulic system.

The number of cooling channels between a cover element and the rotor body particularly preferably corresponds to the number of pole pairs, very particularly preferably twice the number of pole pairs, to achieve the most symmetrical possible cooling capacity over the circumference of the stator body. The cooling channels are preferably of identical design and run along a radial, straight line. Furthermore, the cooling channels are preferably arranged to be equidistant over the circumference of the rotor body.

A cover element is preferably made of high-strength aluminum to be able to provide sufficient strength.

According to a further preferred development of the disclosure, it can also be provided that the first cooling channel has a flow cross-section which corresponds to between 0.5-1.5 of the first flow cross-section of the first radial fluid channel. Furthermore, according to a likewise advantageous embodiment of the disclosure, it can be provided that the second cooling channel has a flow cross-section which corresponds to between 0.5-1.5 of the third flow cross-section of the second radial fluid channel. These measures also support the suppression of undesirably occurring suction effects.

One or more cooling channels can be formed in particular on the end face of an annular disk-shaped cover element which faces the rotor body, which are particularly preferably introduced into the cover element by an embossing process. The end face of an annular disk-shaped cover element which faces away from the rotor body can in particular be of planar design, as a result of which, for example, the development of sensor functions can take place for which a planar sensor target design is required. For example, a cover element can be made of aluminum, which has pocket-shaped recesses arranged to be equidistant in the circumferential direction which are detected by an incremental sensor when the rotor rotates, and are processed into a rotor position signal.

According to a further particularly preferred embodiment of the disclosure, it can be provided that at least one of the cover elements has an outlet channel running in the axial direction. In this way, in particular, the effect can be achieved that axially exiting hydraulic fluid can be directed to the winding overhangs of the stator, which are arranged to be radially above the outlet channel and which can usually be subjected to high thermal loads, so that the overall cooling of the electric machine can be improved.

An outlet channel is particularly preferably positioned essentially in the middle of the magnetic pockets present in the rotor body.

Furthermore, the disclosure can also be further developed such that the outlet channel has a flow cross-section which corresponds to between 50-300% of the first flow cross-section of the first or second radial fluid channel, whereby an undesired suction effect can be further suppressed.

In a likewise preferred embodiment variant of the disclosure, it can also be provided that at least one of the cover elements has a chamfer on the radially inner lateral surface thereof, so that there is a funnel-like transition between one of the cooling channels and the corresponding storage chamber. This can also support a uniform supply of hydraulic fluid to the hydraulic cooling paths of the rotor, since it has been shown that undesired suction effects can be further reduced by a funnel-like transition. The chamfer also directs the hydraulic fluid in the direction of the rotor body, which has an advantageous effect on the cooling. In one possible embodiment of the disclosure, the chamfer can extend completely through a storage chamber in the radial direction and thus form a ring-shaped storage chamber wall.

It can also be advantageous to further develop the disclosure such that the rotor is operated at speeds of up to 12,000-18,000 rpm, wherein the hydraulic system works particularly efficiently and safely in these speed ranges to reduce or avoid undesired suction effects.

According to a further preferred embodiment of the subject matter of the disclosure, it can be provided that the hydraulic channel of the rotor shaft has a third radial fluid channel, which extends outwards in the radial direction and is arranged in the rotor shaft in the axial direction outside of the rotor body, which in particular enables cooling of further components outside of the rotor body to take place within the electric machine.

Finally, the disclosure can also be advantageously implemented in such a way that at least one of the storage chambers has an outer radial contour that is convex in cross-section and curves radially outwards, which has also proven to be an effective measure for reducing or avoiding undesired suction effects.

BRIEF DESCRIPTION OF THE DRAWINGS

The disclosure will be explained in more detail below with reference to figures without limiting the general concept of the disclosure.

In the drawings.

DETAILED DESCRIPTION

Figure 1:
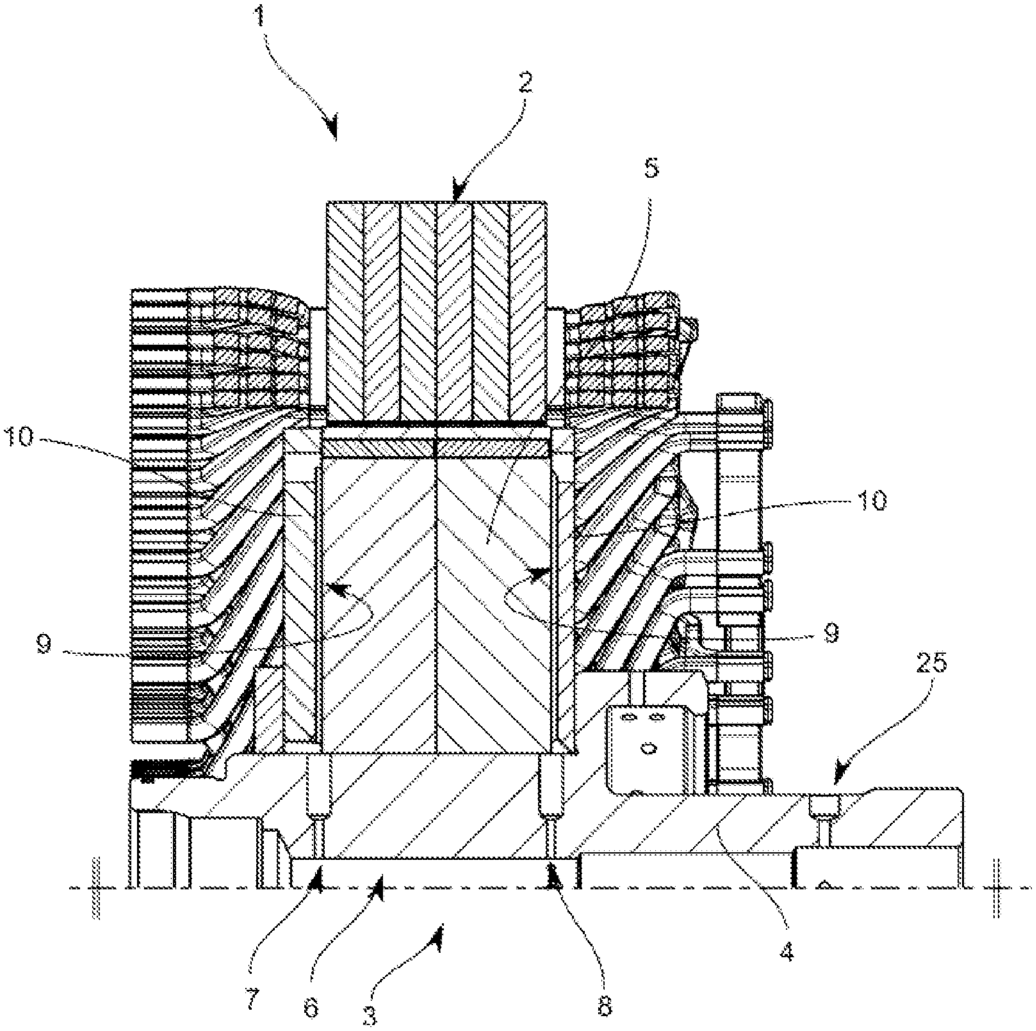
FIG. 1 shows an electric machine in an axial sectional view.

FIG. 1 shows an electric machine 1 comprising a stator 2 and a rotor 3 which is rotatably mounted relative to the stator 2. The rotor 3 has a rotor shaft 4 and a rotor body 5 which is connected to the rotor shaft 4 in a rotationally fixed manner.

Figure 2:
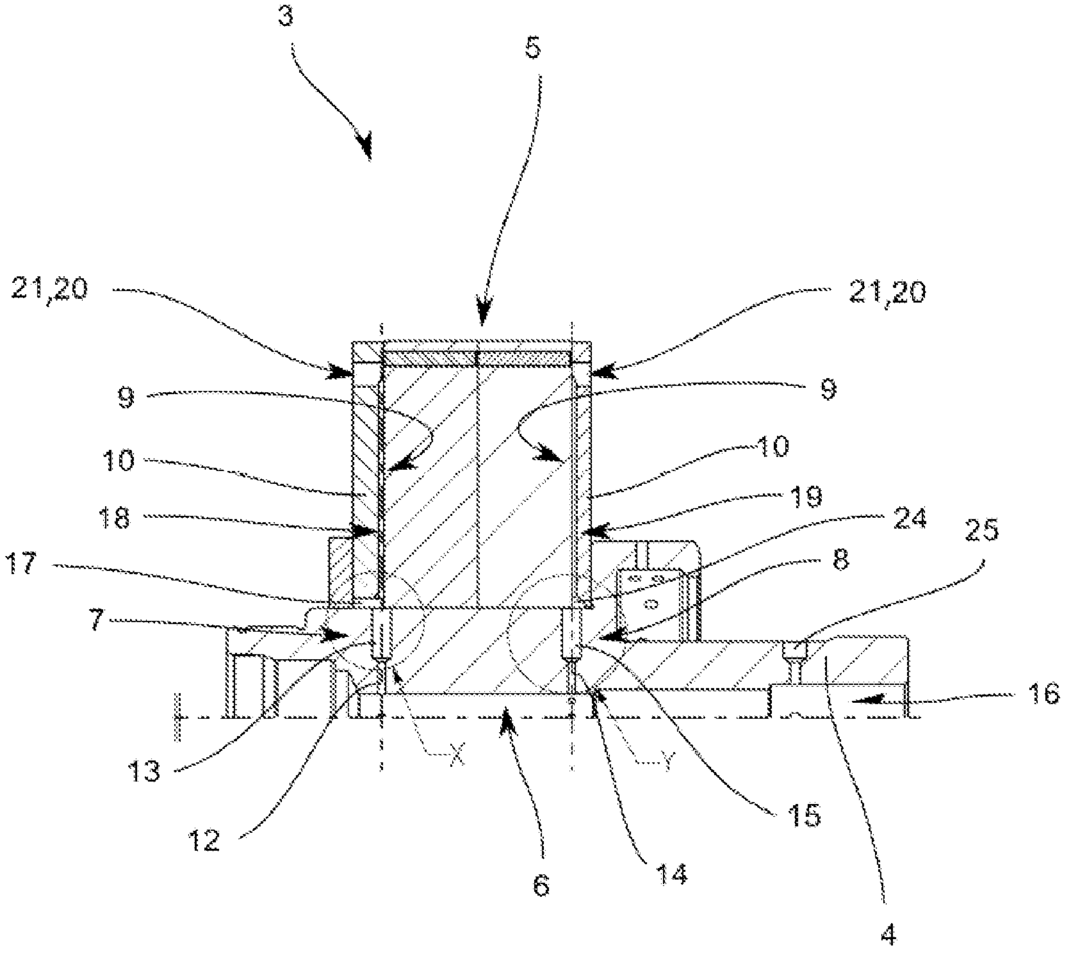
FIG. 2 shows a rotor of the electric machine in an axial sectional view.

As is clearly evident from FIG. 2, the rotor shaft 4 has a hydraulic channel 6 which extends in the axial direction and can be filled with a hydraulic fluid 16, from which a first radial fluid channel 7 extends outwards in the radial direction. On both axial end faces 9 of the rotor body 5, an annular disk-shaped cover element 10 is connected to the rotor body 5 in a rotationally fixed manner. The hydraulic fluid 16 can be conveyed through the hydraulic system described below by means of a hydraulic pump, not shown.

Together with the axial end face 9 of the rotor body 5, the cover element 10 forms at least one first cooling channel 18 that is open on both sides and that can be hydraulically coupled to the first radial fluid channel 7, so that a hydraulic fluid 16 can be conveyed in a centrifugal force-supported manner out of the hydraulic channel 6 of the rotor shaft and in the radial direction through the radial fluid channel 7 and the first cooling channel 18.

Figure 3:
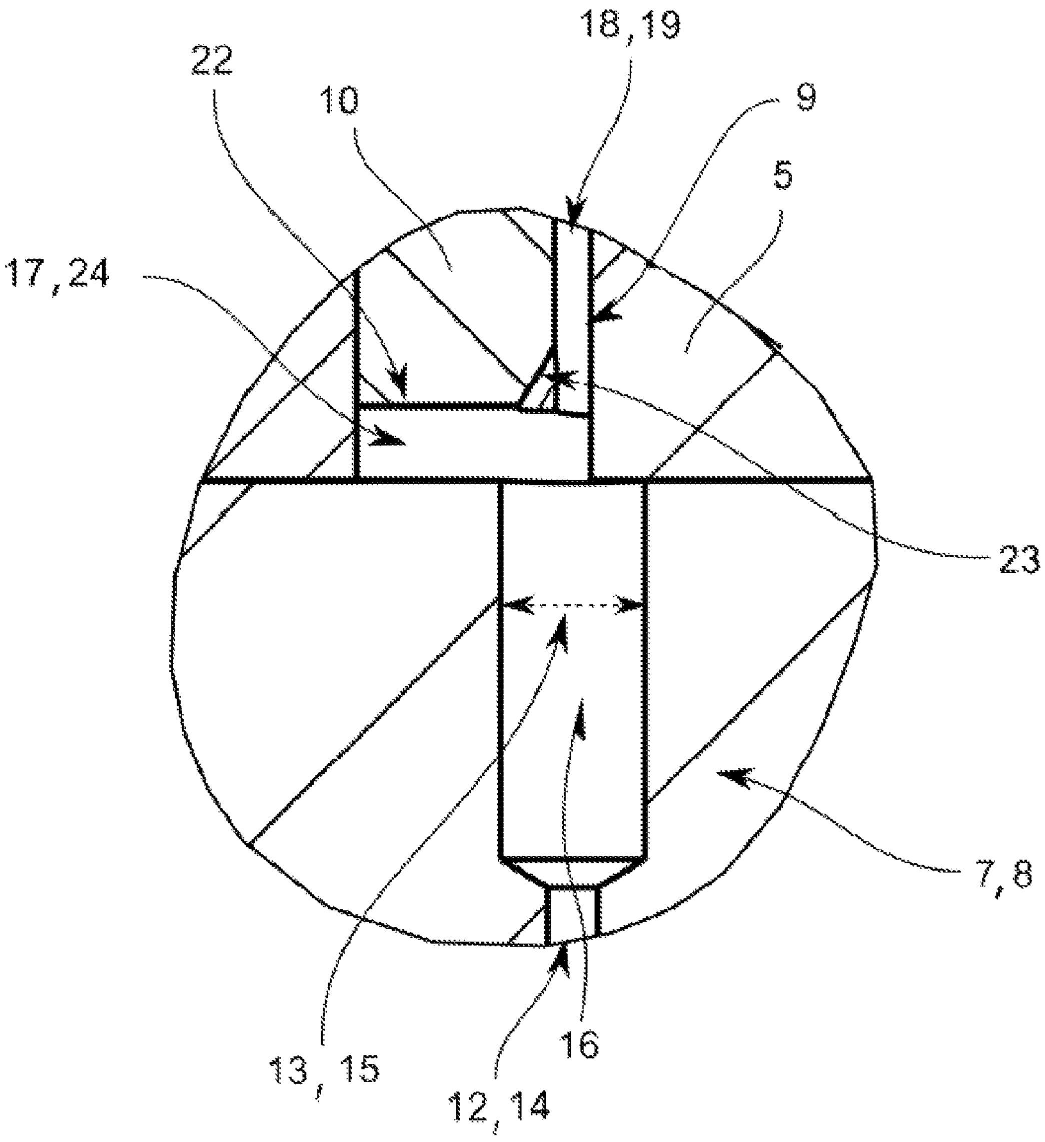
FIG. 3 shows a detailed view of the region around a storage chamber of the rotor in an axial sectional view.

As shown in the detailed view of FIG. 3, the first radial fluid channel 7 has a first flow cross-section 12 and a second flow cross-section 13 formed in the radial direction above the first flow section 12. The first flow cross-section 12 and the second flow cross-section 13 have a ratio of between 1:1.5-1:25, wherein between 15-25% of the second flow cross-section 13 of the first radial fluid channel 7 is covered in sections in the axial direction by the rotor body 5. The second flow cross-section 13 opens into a first storage chamber 17, which is arranged in the radial direction between the rotor shaft 4 and the first cooling channel 18, wherein the volume of the first radial flow channel 7 has a ratio of between 0.5:1-3:1 to the volume of the first storage chamber 17.

It can also be seen from FIG. 2 that, starting from the hydraulic channel 6, the first radial fluid channel 7 and a second radial fluid channel 8 axially spaced apart therefrom extends outwards in the radial direction. Here, too, the cover element 10, together with the corresponding axial end face 9 of the rotor body 5, forms at least one cooling channel which is open on both sides and which can be hydraulically coupled to the radial fluid channel 8, so that the rotor 3 has at least one corresponding first cooling channel 18 and at least one second cooling channel 19.

The hydraulic fluid 16 can thus be conveyed out of the hydraulic channel 6 of the rotor shaft 4 by centrifugal force and in the radial direction through the radial fluid channels 7, 8 and the cooling channels 18, 19. Like the first, the second radial fluid channel 8 also has a third flow cross-section 14 and a fourth flow cross-section 15 formed in the radial direction above the third flow section 14, wherein the third flow cross-section 14 and the fourth flow cross-section 15 have a ratio of between 1:1.5-1:25 and wherein between 15-25% of the fourth flow cross-section 15 of the second radial fluid channel 8 is covered in sections in the axial direction by the rotor body 5. The fourth flow cross-section 12 opens into a second storage chamber 24, which is arranged in the radial direction between the rotor shaft 4 and the second cooling channel 19, wherein the volume of the second radial flow channel 8 has a ratio of between 0.5:1-3:1 to the volume of the second storage chamber 24.

The cover elements 10 each have an outlet channel 20 running in the axial direction, which has a flow cross-section 21 which corresponds to between 50-300% of the first flow cross-section 12, 14 of the first or second radial fluid channel 7, 8. This makes it possible for the hydraulic fluid 16 to be thrown out of the rotor 2 onto the end windings of the stator 2 so that the latter can be cooled accordingly, which can be clearly understood from FIG. 1. The cooling channels 18, 19 can in particular be embossed in the cover elements 10 so that machining can be dispensed with.

As can be clearly seen from FIG. 2, the two hydraulic paths starting from the first flow section 12 and the third flow section 14 to the respective outlet channel 20 are of essentially identical design.

It is also easy to see from FIG. 3 that the first cooling channel 18 has a flow cross-section which is between 0.5-1.5 of the first flow cross-section 12 of the first radial fluid channel 7 and the second cooling channel 19 has a flow cross-section which corresponds to between 0.5-1.5 of the third flow cross-section 14 of the second radial fluid channel 8.

The cover elements 10 each have a chamfer 23 on the radially inner lateral surface 22 thereof, so that there is a funnel-like transition between one of the cooling channels 18, 19 and the corresponding storage chamber 17, 24.

The hydraulic channel 6 of the rotor shaft 4 also has a third radial fluid channel which extends outwards in the radial direction and is arranged in the rotor shaft 4 in the axial direction outside of the rotor body 5. The third radial fluid channel 25 is provided in particular to cool other components of the electric machine 1.

Figure 4:
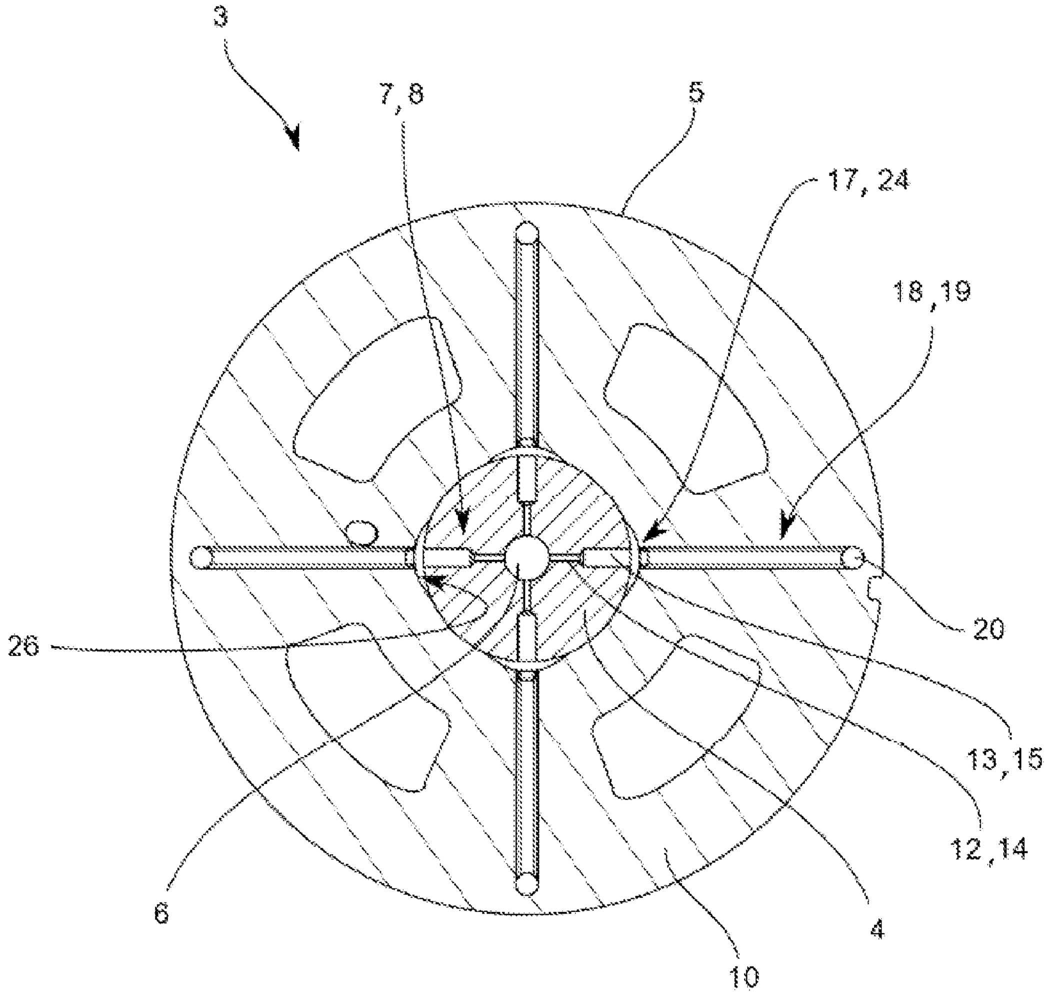
FIG. 4 shows a cross-sectional diagram of the rotor.

FIG. 4 shows a cross-sectional view of the rotor 3 known from FIG. 2. One can see four cooling channels 18, 19 which are offset from one another by 90° in the circumferential direction and run radially outwards from the rotor shaft 4, each of which opens into an outlet channel 20. The cross-sectional view clearly shows that the storage chambers 17, 24 each have an outer radial contour 26 that is convex in cross-section and curves radially outward.

Figure 5:
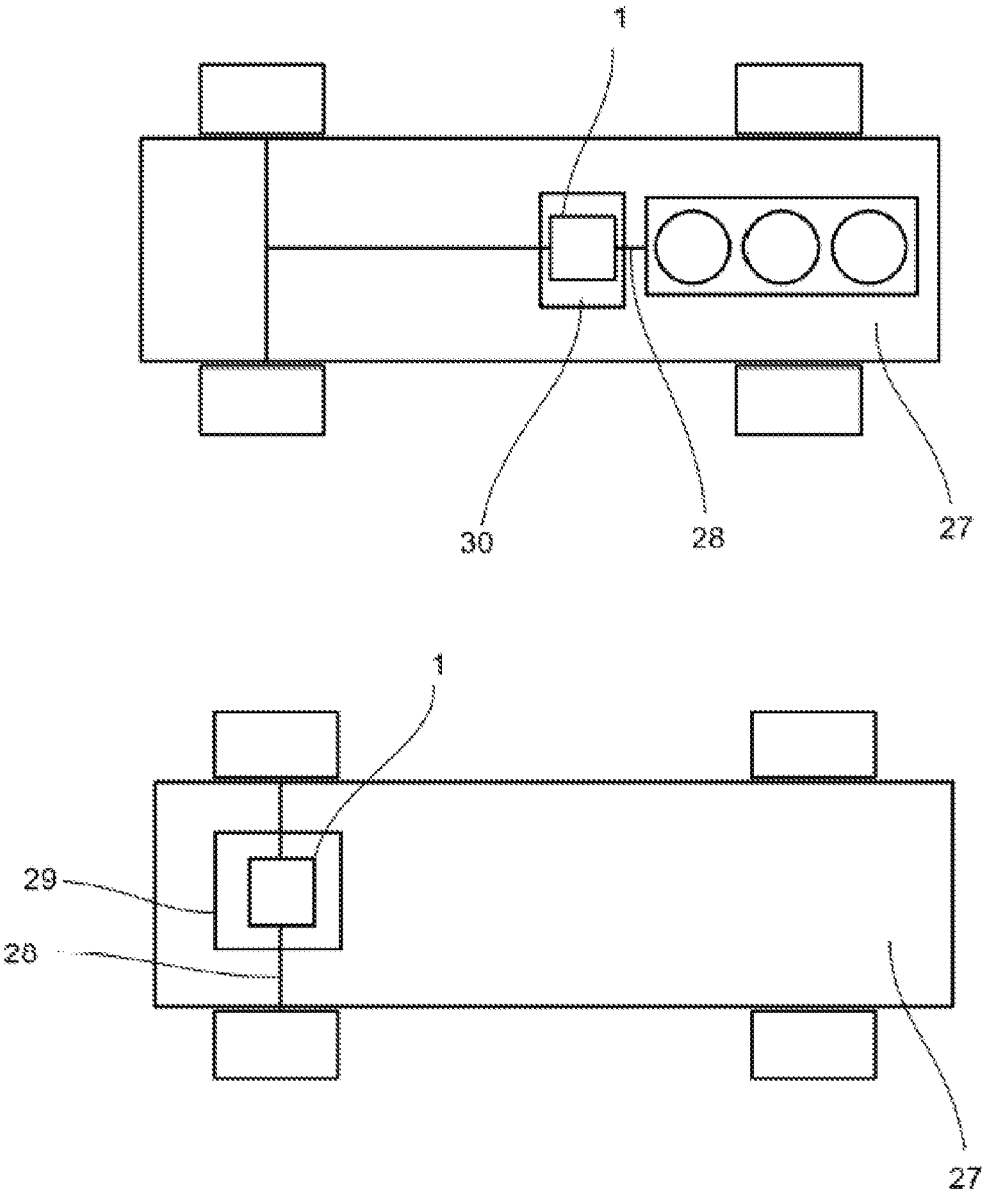
FIG. 5 shows a motor vehicle having a hybrid and fully electric drive train in a schematic block diagram.

The electric machine 1 is intended in particular for use in a hybrid or fully electric drive train 28 of a motor vehicle 27, as is shown as an example in FIG. 5. In the upper illustration of FIG. 5, a hybrid module 30 with an electric machine 1 is integrated into the drive train 28, while in the lower illustration an electric axle drive train 29 having an electric machine 1 is integrated into the drive train 28 of the corresponding motor vehicle 27.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Electric machine
2 Stator
3 Rotor
4 Rotor shaft
5 Rotor body
6 Hydraulic channel
7 First radial fluid channel
8 Second radial fluid channel
9 End face
10 Cover element
12 First flow cross-section
13 Second flow cross-section
14 Third flow cross-section
15 Fourth flow cross-section
16 Hydraulic fluid
17 First storage chamber
18 First cooling channel
19 Second cooling channel
20 Outlet channel
21 Flow cross-section
22 Lateral surface
23 Chamfer
24 Second storage chamber
25 Third radial fluid channel
26 Radial contour
27 Motor vehicle
28 Drive train
29 Electric axle drive train
30 Hybrid module

The invention claimed is:

1. An electric machine comprising:

a stator; and a rotor which is rotatably mounted relative to the stator, the rotor comprising a rotor shaft and a rotor body which is connected to the rotor shaft in a rotationally fixed manner, wherein the rotor shaft has a hydraulic channel which extends in an axial direction and can be filled with a hydraulic fluid, from which a first radial fluid channel extends outwards in a radial direction, wherein at least one annular disk-shaped cover element is connected to the rotor body in a rotationally fixed manner on an axial end face of the rotor body, and the cover element together with the axial end face of the rotor body forms at least one first cooling channel open on both sides which can be hydraulically coupled to the first radial fluid channel so that a hydraulic fluid can be conveyed in a centrifugal force-supported manner out of the hydraulic channel of the rotor shaft and in the radial direction through the radial fluid channel and the first cooling channel, wherein the first radial fluid channel has a first flow cross-section and a second flow cross-section formed in the radial direction above the first flow section within the rotor shaft, the first flow cross-section and the second flow cross-section being coaxially aligned in the radial direction, wherein the first flow cross-section and the second flow cross-section have a ratio of between 1:1.5-1:25 such that the second flow-cross-section is larger than the first flow cross-section, wherein between 5%-75% of the second flow cross-section of the first radial fluid channel is covered in sections in the axial direction by the rotor body, wherein the second flow cross-section opens into a first storage chamber, which is arranged in the radial direction between the rotor shaft and the first cooling channel, wherein a volume of the first radial flow channel has a ratio of between 0.5:1-3:1 to the volume of the first storage chamber; and wherein at least one of the cover elements has an outlet channel running in the axial direction and opening to an axial end face of the cover element.

2. The electric machine according to claim 1, wherein the rotor shaft has a hydraulic channel which extends in the axial direction and can be filled with the hydraulic fluid, from which the first radial fluid channel and a second radial fluid channel axially spaced apart therefrom extend outwards in the radial direction, wherein at least one annular disk-shaped cover element is connected to the rotor body in a rotationally fixed manner on the axial end faces of the rotor body, and the cover element is connected to one of the axial end faces of the rotor body to form at least one cooling channel open on both sides, which can be hydraulically coupled to one of the radial fluid channels, so that the rotor has at least one corresponding first cooling channel and at least one second cooling channel so that a hydraulic fluid can be conveyed out of the hydraulic channel of the rotor shaft and in the radial direction through the radial fluid channels and the cooling channels by centrifugal force, wherein the second radial fluid channel has a third flow cross-section and a fourth flow cross-section formed in the radial direction above the third flow section, wherein the third flow cross-section and the fourth flow cross-section have a ratio of between 1:1.5-1:25 wherein between 5%-75% of the fourth flow cross-section of the second radial fluid channel is covered in sections in the axial direction by the rotor body, and the fourth flow cross-section opens into a second storage chamber which is arranged in the radial direction between the rotor shaft and the second cooling channel, and wherein the volume of the second radial flow channel has a ratio of between 0.5:1-3:1 to the volume of the second storage chamber.

3. The electric machine according to claim 2, wherein:

the second cooling channel has a flow cross-section which corresponds to between 0.5-1.5 of the third flow cross-section of the second radial fluid channel.

4. The electric machine according to claim 1, wherein:

the first cooling channel has a flow cross-section which corresponds to between 0.5-1.5 of the first flow cross-section of the first radial fluid channel.

5. The electric machine according to claim 1, wherein:

the outlet channel has a flow cross-section which corresponds to between 50-300% of the first flow cross-section of the first or second radial fluid channel.

6. The electric machine according to claim 1, wherein:

at least one of the cover elements has a chamfer on a radially inner lateral surface thereof so that there is a funnel-like transition between one of the cooling channels and the corresponding storage chamber.

7. The electric machine according to claim 1, wherein:

the rotor is operated at speeds of up to 12,000-18,000 rpm.

8. The electric machine according to claim 1, wherein:

the hydraulic channel of the rotor shaft has a third radial fluid channel which extends outwards in the radial direction and is arranged in the rotor shaft in the axial direction outside the rotor body.

9. The electric machine according to claim 1, wherein:

at least one of the storage chambers has an outer radial contour which is convex in cross-section and curves radially outwards.

* * * * *